A. KELLER-DORIAN.
SELECTING SCREEN FOR POLYCHROMATIC PHOTOGRAPHY.
APPLICATION FILED FEB. 2, 1921.
1,372,515. Patented Mar. 22, 1921.
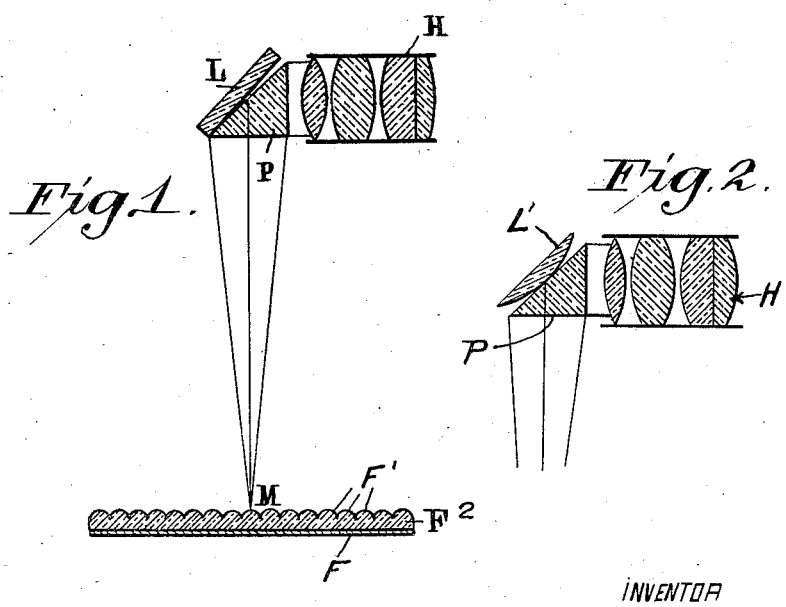
INVENTOR
Albert Keller-Dorian
BY
ATTORNEY

UNITED STATES PATENT OFFICE.

ALBERT KELLER-DORIAN, OF MULHOUSE, FRANCE.

SELECTING-SCREEN FOR POLYCHROMATIC PHOTOGRAPHY.

1,372,515. Specification of Letters Patent. Patented Mar. 22, 1921.

Application filed February 2, 1921. Serial No. 441,899.

*To all whom it may concern:*

Be it known that I, ALBERT KELLER-DORIAN, a citizen of the Republic of France, resident of Mulhouse, France, (post-office address Rue Daguerre,) have invented new and useful Selecting-Screens for Polychromatic Photography, which selecting screen is fully set forth in the following specification.

It is well known that the phenomenon of total reflection on the internal face of a refracting medium can only occur if such face is separated from every medium of the same refraction index a distance at least equal to one-fourth the wave length. It follows, then, that if there is arranged at the back of the reflecting surface a surface of the same refraction index spaced a distance increasing from zero (absolute contact) to the length of the greatest wave of the visible spectrum:—

1. At the points where the distance is less than one-fourth of the shortest visible light wave, no reflection will take place and the color sensation will be that of black;—
2. Starting from the point where the distance becomes greater than that minimum, the colors of the spectrum will appear successively from violet to red;—
3. Finally, if the distance commences to increase beyond the extent necessary for the reflection of the red rays, a second spectrum (of the second class) will be seen to succeed the first one, and so on, until the colors merge into white light.

The present invention relates to the utilization of this phenomenon for the polychromatic selection necessary in certain processes of color photography, notably those based on the employment of photographic surfaces applied to supports having microscopic refracting elements.

The process is based on the formation on the sensitized layer of as many elementary photographs of the objective as the support for the sensitized layer comprises microscopic refracting elements. In order that the process may involve the polychromatic selection of the rays emanating from the object, it is essential that the rays of different colors pass through the objective at different points. The solution evolved by the Berthon process is known, according to which the difference in incidence of the different color rays is obtained simply by covering the aperture of the objective by means of suitably arranged trichrome selecting screens. This arrangement has the disadvantage of utilizing colored screens which are necessarily arbitrary and which necessarily distort the natural colors. The arrangement hereinafter described is free from this defect.

Figure 1 of the accompanying drawing is a diagram illustrating one way of carrying out the invention, and Fig. 2 is a diagram illustrating a slight modification or development.

Referring to Fig. 1, P indicates a glass prism for total reflection; L is a plate with exactly plane surfaces and forming a very small angle with the hypotenuse of the prism.

The prism P and plate L are arranged behind an objective H. In the focal plane of this objective there is placed a transparent plate $F^2$ having miscropic refracting elements $F'$ formed upon one face and carrying a sensitized layer F upon its other face. From any point M on the plate $F^2$, the aperture of the objective appears colored according to the colors reflected by the parts P, L, assuming, be it understood, that the objective transmits white light to the point M. If the light transmitted is monochromatic, only the part of the objective corresponding to the reflection of that particular color will appear luminous. If the light is a complex, polychromatic one, the objective will appear in the form of colored bands corresponding to the spectrum of the light in question. Accordingly, each microscopic refracting element $F'$ of the photographic plate or film will record a micro-spectro-photograph of the light rays which strike against it. The chromatic analysis will thus be effected independently of any individual factor, solely by reason of the properties of the light itself.

It is to be noted that the apparatus above described is not necessarily constituted by a plane-surfaced prism and a plane-surfaced plate. The plate, among other forms, can be slightly convex, as represented at $L'$ in Fig. 2 and can touch the hypotenuse face of the prism at its center. In such case, the colors will be arranged concentrically around a dark point, in the same way as Newton's rings in their original form.

I claim as my invention:—

1. Apparatus for polychromatic photography, comprising a camera lens, a transparent support having microscopic refracting elements on one face and a sensitized coating on the other face, and transparent elements having relatively-inclined surfaces for the purpose of producing an interference spectrum, said inclined surfaces being located between the lens and the transparent support, and the face of said support bearing said refracting elements being directed toward said inclined surfaces.

2. Apparatus according to claim 1, in which one of the relatively-inclined surfaces is the hypotenuse of a total reflection prism.

3. Apparatus for polychromatic photography, comprising a camera lens, a transparent support having microscopic refracting elements on one face, and a sensitized coating on the other face, a total reflection prism, and a plane-surfaced plate disposed at a slight angle to the hypotenuse of the prism, said plate and said prism being located behind said lens, and the face of said support bearing said refracting elements being directed toward the plate and prism.

In testimony whereof I have signed this specification.

ALBERT KELLER-DORIAN.